United States Patent
Gill et al.

(10) Patent No.: US 10,176,562 B2
(45) Date of Patent: Jan. 8, 2019

(54) OPTICAL FLOW SENSING AND PATTERN RECOGNITION WITH ANTI-SYMMETRIC PHASE GRATINGS

(71) Applicant: Rambus Inc., Sunnyvale, CA (US)

(72) Inventors: Patrick R. Gill, Sunnyvale, CA (US); David G. Stork, Portola Valley, CA (US); Patrick R. Johnstone, Champaign, IL (US)

(73) Assignee: Rambus Inc., Sunnyvale, CA (US)

( * ) Notice: Subject to any disclaimer, the term of this patent is extended or adjusted under 35 U.S.C. 154(b) by 17 days.

(21) Appl. No.: 15/119,701

(22) PCT Filed: Feb. 19, 2015

(86) PCT No.: PCT/US2015/016569
§ 371 (c)(1),
(2) Date: Aug. 17, 2016

(87) PCT Pub. No.: WO2015/127043
PCT Pub. Date: Aug. 27, 2015

(65) Prior Publication Data
US 2017/0084046 A1    Mar. 23, 2017

Related U.S. Application Data

(60) Provisional application No. 61/944,034, filed on Feb. 24, 2014.

(51) Int. Cl.
*G06K 9/46* (2006.01)
*G06T 5/10* (2006.01)
(Continued)

(52) U.S. Cl.
CPC .................. *G06T 5/10* (2013.01); *G02B 5/18* (2013.01); *G02B 27/42* (2013.01);
(Continued)

(58) Field of Classification Search
None
See application file for complete search history.

(56) References Cited

U.S. PATENT DOCUMENTS 4,396,943 A    8/1983    Lord et al.
6,740,881 B2   5/2004    Malmin
(Continued)

FOREIGN PATENT DOCUMENTS

EP    2 626 686 A1    8/2013
WO    PCT-2014-137922 A1    9/2014

OTHER PUBLICATIONS

Stork et al, Lensless Ultra-Miniature CMOS Computational Imagers and Sensors, SENSORCOMM 2013 : The Seventh International Conference on Sensor Technologies and Applications.*
(Continued)

*Primary Examiner* — Andrae S Allison
(74) *Attorney, Agent, or Firm* — Silicon Edge Law Group LLP; Arthur J. Behiel

(57) ABSTRACT

An optical method of measuring motion employs a phase grating that produces a diffraction pattern responsive to light from an imaged scene. First and second images of the diffraction pattern are captured and compared to produce an image comparison. Apparent motion is then calculated from the image comparison.

13 Claims, 16 Drawing Sheets

(51) Int. Cl.
  G02B 5/18    (2006.01)
  G02B 27/42   (2006.01)
  G02B 27/46   (2006.01)
  G06T 7/20    (2017.01)
(52) U.S. Cl.
  CPC ......... *G02B 27/4205* (2013.01); *G02B 27/46* (2013.01); *G06T 7/2033* (2013.01); *G06T 2207/10004* (2013.01)

(56) References Cited

U.S. PATENT DOCUMENTS

| | | | | |
|---|---|---|---|---|
| 6,826,422 | B1* | 11/2004 | Modell | A61B 1/00059 250/461.2 |
| 8,144,376 | B2 | 3/2012 | Zomet et al. | |
| 2003/0100824 | A1* | 5/2003 | Warren | A61B 5/0066 600/407 |
| 2008/0212838 | A1* | 9/2008 | Frigerio | G06K 9/209 382/107 |
| 2008/0287808 | A1* | 11/2008 | Tearney | A61B 5/0059 600/476 |
| 2009/0190120 | A1* | 7/2009 | Wustefeld | G01D 3/08 356/27 |
| 2011/0133088 | A1* | 6/2011 | Albo | B82Y 20/00 250/338.4 |
| 2012/0193517 | A1 | 8/2012 | Zickler et al. | |
| 2013/0229486 | A1* | 9/2013 | Molnar | G06T 1/0007 348/43 |
| 2014/0168458 | A1* | 6/2014 | Richards | G06T 3/40 348/222.1 |
| 2016/0057407 | A1* | 2/2016 | Klehm | H04N 5/2254 348/343 |

OTHER PUBLICATIONS

Zhang et al, Lensless Fourier-transform ghost imaging with classical incoherent light, Physical Review A 75, 021803R 2007.*
Martin, A. V., et al. "The extraction of single-particle diffraction patterns from a multiple-particle diffraction pattern." Optics express 21.13 (2013): 15102-15112.*
Garcia-Martinez et al., "Generation of Bessel Beam Arrays Through Dammann Gratings", Mar. 20, 2012, vol. 51, No. 9, Applied Optics. pp. 1375-1381. 7 Pages.
Gill, Patrick et al., "Lensless Ultra-Miniature Imagers Using Odd-Symmetry Spiral Phase Gratings", article presented at Computational Optical Sensing and Imaging (COSI), Arlington, Virginia, Jun. 23-27, 2013. 3 pages.
Gill, Patrick et al., "Lensless Ultra-Miniature Imagers Using Odd-Symmetry Spiral Phase Gratings", slide deck presented at Computational Optical Sensing and Imaging (COSI), Arlington, Virginia, Jun. 23-27, 2013. 18 pages.
Guerineau et al., "Generation of Achromatic and Propagation-Invariant Spot Arrays by Use of Continuously Self-Imaging Gratings," Apr. 1, 2001, vol. 26, No. 7, Optics Letters. pp. 411-413. 3 Pages.
Huang, Gang et al., "Lensless Imaging by Compressive Sensing," 2013 IEEE International Conference on Image Processing (ICIP 2013) accepted for presentation, Sep. 2013. 5 pages.
Jacobs, Nathan et al., "Compressive Sensing and Differential Image-Motion Estimation," Proceedings of 2010 IEEE International Conference on Acoustics, Speech and Signal Processing (ICASSP), Mar. 14-19, 2010, pp. 718-721. 4 pages.
Morrison, Rick L., "Symmetries that simplify the design of spot array phase gratings", Journal of the Optical Society of America A, vol. 9, Issue 3, pp. 464-471, 1992. 8 pages.
Notification Concerning Transmittal of International Preliminary Report on Patentability With dated Sep. 9, 2016 re: Int'l Appln. No. PCT/US15/016569. 9 Pages.
PCT International Search Report and Written Opinion dated Jul. 8, 2015 in International Application No. PCT/US2015/016569. 12 pages.
Stenner, M.D. et al., "Static Architecture for Compressive Motion Detection in Persistent, Pervasive Surveillance Applications," Conference Paper, Imaging Systems, OSA Technical Digest (CD) (Optical Society of America, 2010), Jun. 7-8, 2010. 3 pages.
Wang, Albert et al., "Phase-Based 3D Optical Flow Sensors for Motion Detection," 2011 Image Sensors, pp. 683-686, Oct. 28-31, 2011. 4 pages.
Dixon, Brandon J. et al., "Measuring microlymphatic flow using fast video microscopy," Journal of Biomedical Optics 10(6), 064016, Nov./Dec. 2005, 7 pages.
Wang, Jie et al., "An Edge-Weighted Centroidal Voronoi Tessellation Model for Image Segmentation," IEEE Transactions on Image Processing, vol. 18, No. 8, Aug. 2009, pp. 1844-1858.
Kulkarni, Kuldeep, "Reconstruction-free action inference from compressive imagers," Cornel University Library, arXiv:1501.04367v1 [cs.CV] Jan. 18, 2015, 14 pages.
Li, Li-Jia et al., "Objects as Attributes for Scene Classification," ECCV 2010 Workshops, PartI, LNCS 6553, pp. 57-59 2012.
Meethongjan, K. et al., "Face Recognition based on Fusion of Voronoi Diagram Automatic Facial and Wavelet Moment Invariants," IJVIPNS-IJENS vol. 10 No. 4, Aug. 2010.
Moudani, Walid et al., "Efficient Image Classification using Data Mining," Intl Journal of Combinatorial Optimization Problems and Informatics, vol. 2 No. 1, Jan.-Apr. 2011 18 pp.
Zafeiriou, Stefanos, "Face Recognition and Verification Using Photometric Stereo: The Photoface Database and a Comprehensive Evaluation," IEEE TIFS vol. 8 No. 1 Jan. 2013 15pp.
Ragab, Ahmed et al., "Intelligent Data Mining for Automatic Face Recognition," TOJSAT vol. 3 issue 2, Apr. 2013, 5 pp.

* cited by examiner

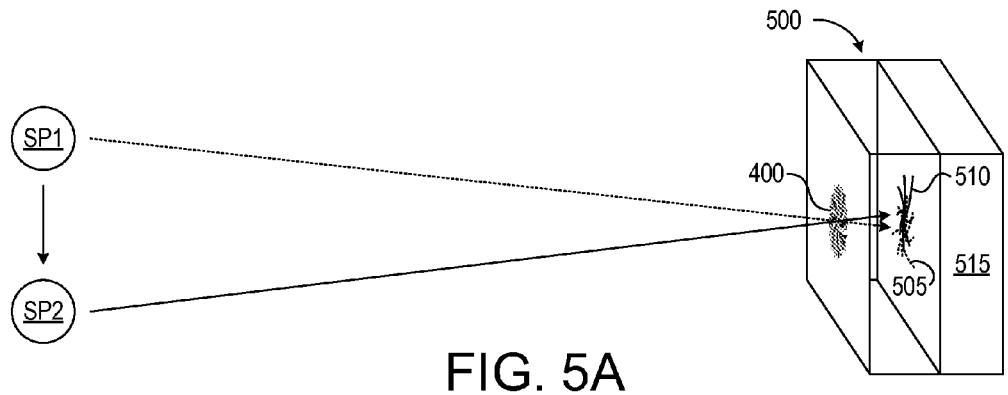
FIG. 5A
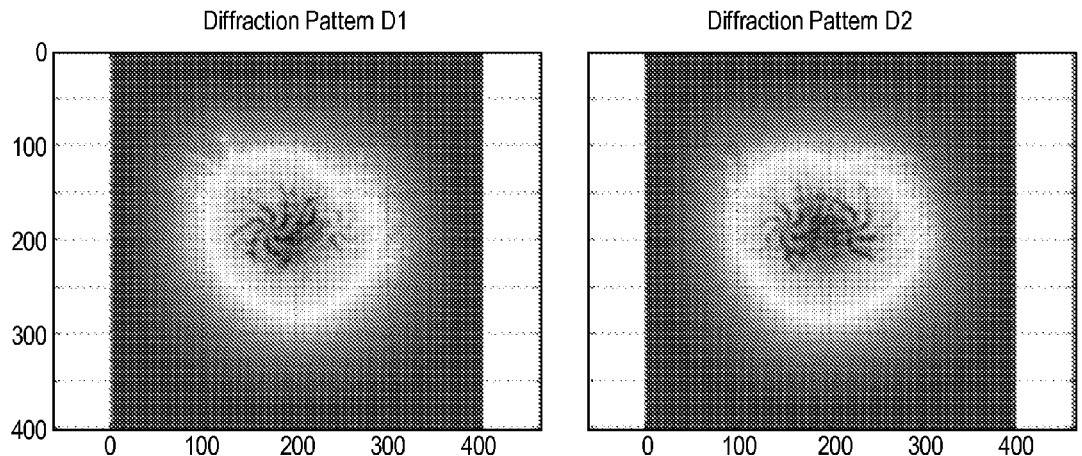
FIG. 5B
FIG. 5C
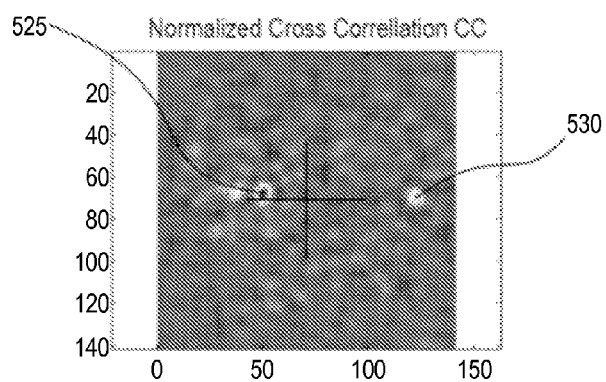
FIG. 5D

1470

1475

1500

1505

OPTICAL FLOW SENSING AND PATTERN RECOGNITION WITH ANTI-SYMMETRIC PHASE GRATINGS

BACKGROUND

Traditional cameras use a lens or lenses to image each point in a scene onto a single point on a sensor. In digital cameras, the sensor is a two-dimensional array of picture elements, or "pixels," that encodes the imaged scene into digital image data for storage, processing, and reproduction.

Digital imaging has enabled new imaging architectures. Cathey and Dowski took an early and conceptually important step away from the traditional model by exploiting digital processing. They designed a cubic-phase optical plate which, when inserted into the optical path of a traditional camera, led to an image whose (significant) blur was independent of the object depth: the image on the sensor plane did not "look good" as it would in a traditional camera. However, subsequent image processing sharpened the entire blurred image, thus leading to enhanced depth of field. Since then the field of computational imaging has explored imaging architectures in which the raw signals do not superficially resemble a traditional image; instead, the final image is computed from such signals. More and more of the total imaging "burden" is borne by computation, thereby expanding the class of usable optical components. In this way, many optical aberrations can be corrected computationally rather than optically. This imaging paradigm has led to new conceptual foundations of joint design of optics and image processing, as well as a wide range of non-standard imaging architectures such as plenoptic, coded-aperture and multi-aperture systems, each with associated methods of signal processing.

The economic pressures for miniaturization of electronic devices, including cameras, arising in the mobile computing market have led to smaller imager form factors. Recently, a new miniature imaging architecture has been explored, one based on integrating diffractive optics with photodetector arrays. This architecture forgoes lenses and relies instead on diffraction gratings that can be created using processes similar to those used to create the underlying sensor. For a given image resolution, such diffractive elements enable the construction of imaging devices much smaller than possible using the optical paths of traditional cameras, and at a much lower cost.

BRIEF DESCRIPTION OF THE DRAWINGS

The detailed description is illustrated by way of example, and not by way of limitation, in the figures of the accompanying drawings and in which like reference numerals refer to similar elements and in which:

FIG. 5A shows an image sensor 500 imaging a scene element that moves from a first scene position SP1 to a second scene position SP2 to illustrate how one embodiment can be used to detect and measure motion.

FIGS. 5B and 5C are exemplary diffraction patterns D1 and D2 that represent consecutive frames taken by an image sensor of the type detailed above in connection with FIG. 5A as the apparent scene shifts in a largely x-direction.

FIG. 5D is a normalized cross-correlation CC of diffraction patterns D1 and D2 of FIGS. 5B and 5C.

DETAILED DESCRIPTION

Figure 1A:
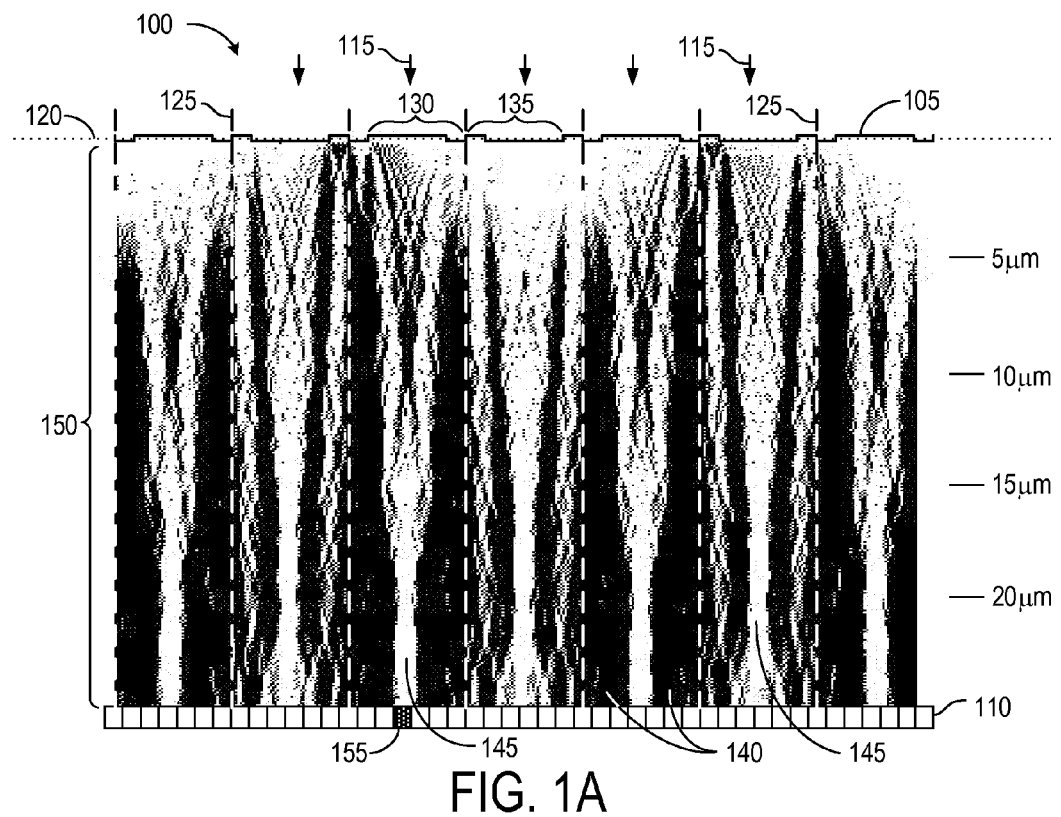
FIG. 1A is a cut-away view of an imaging device 100 with a phase antisymmetric grating 105 overlying a photodetector array 110.

FIG. 1A is a cut-away view of an imaging device 100 that support computational diffractive imaging. Device 100 includes a phase antisymmetric grating 105 overlying a photodetector array 110, such as a CCD (charge-coupled device), CMOS (complementary metal-oxide-semiconductor) or (in the case of thermal IR detection) a microbolometer sensor. The photodetector array may comprise a lenslet array designed to concentrate incident photons onto the most sensitive areas of the array to increase quantum efficiency. The features of grating 105 offer considerable insensitivity to the wavelength of incident light in a wavelength band of interest, and also to the manufactured distance between grating 105 and photodetector array 110. Grating 105 produces an interference pattern for capture by array 110. Digital photographs and other image information can then be extracted from the pattern.

Imaging device 100 does require a lens, and so can be extremely small and inexpensive. Captured interference patterns are unintelligible to a human observer, but the captured data includes sufficient information to allow the image or aspects of the image to be computed. As detailed below, computational diffractive imagers of this type can be tailored to extract application-specific information or compute decisions (rather than compute an image) based on the optical signal. Both the phase grating and the signal processing can be optimized for the information in the visual field and the task at hand.

In FIG. 1A, light in a wavelength band of interest is depicted as striking grating 105 from a direction 115 that is normal to a transverse plane 120 of the grating 105. The wavelength band of interest can be the visible spectrum. Cameras developed for use in different applications can have different bands of interest.

Dashed lines 125 highlight periodic boundaries between regions of phase antisymmetry. Each of these boundaries is a result of features 130 and 135 of odd symmetry, and produces a normally arranged curtain 140 of minimum intensity created by destructive phase interference between adjacent features 130 and 135. Curtains 140 are separated by foci 145 (curtains of maximum light intensity), and the collection of curtains 140 and foci 145 extend from grating 105 through the body 150 of device 100 to produce an interference pattern on photodetector array 110. In this illustration, the pattern of intensity variations evident in the foci and curtains are near-field spatial modulations that result from near-field diffraction. One photosensitive element 155 within array 110 is shaded beneath a focus 145 to serve as a reference for a subsequent discussion of the sensitivity of device 100 to the angle of incident light.

The image of FIG. 1A resulted from a simulation of an imaging device with the following parameters and assuming specific parameters. Body 150 is of fused silica, and is in contact with a conventional photodetector array 110 with photosensitive elements spaced by 2.2 µm. The top of grating 105 is an air interface in this example. The relatively small segments of features 130 and 135 are about 1 µm, and the relatively larger segments are about 4 µm. These segments generally form transverse plane 120, which is separated from array 110 by about 25 µm. Curtains 140 and foci 145 are the destructive and constructive interference patterns for 532 nm incident light.

The thickness of body 150 and lengths of the segments of features 130 and 135 were optimized for 400 nm light despite the selection of 532 nm light for the simulation. As a consequence, the tightest focus occurs about 5 µm above array 110 (at the 20 µm mark), or about a depth of about forty times the wavelength of incident light used for the simulation. The resultant curtains 140 plainly separate foci 145 well above and below the 20 µm mark, however, illustrating a robust insensitivity to wavelength within the band of interest. Curtains 140 are easily distinguished at depths beyond about 10 µm in this example, or about twenty times the wavelength of incident light used in the simulation. The relatively deep and continuous penetration of curtains 140 also provides considerable manufacturing tolerance for the thickness of body 150. These advantages obtain because the near-field spatial modulations projected onto array 110 are substantially wavelength independent over the wavelength band of interest, which means that the adjacent modulations (dark and light) do not reverse signs with changes in wavelength within the band of interest.

Figure 1B:
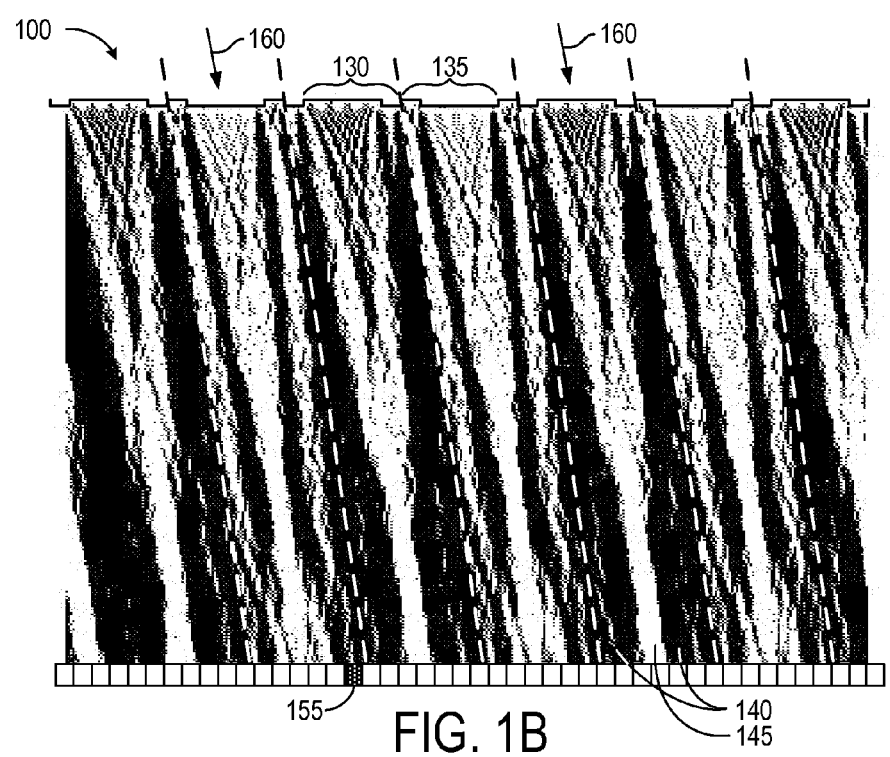
FIG. 1B depicts sensor 100 of FIG. 1A simulating light incident plane 120 at an acute angle 160 to illustrate the sensitivity of curtains 140 and foci 145 to the angle of incidence.

FIG. 1B depicts sensor 100 of FIG. 1A simulating light incident plane 120 at an acute angle 160 to illustrate the sensitivity of curtains 140 and foci 145 to the angle of incidence. Using element 155 as a reference point, we see that that the foci 145 that illuminated element 155 in FIG. 1A have considerably moved to the right in FIG. 1B. Curtains 140 and foci 145 extend at an acute angle that relates to angle 160 according to Snell's law. The separation of foci 145 by curtains 140 is maintained. Sensor 100 is thus sensitive to the angle of incidence.

Each phase antisymmetric structure generates a diffraction pattern, and the resultant collection of patterns is itself a pattern. For a point source, this pattern of light intensity on the sensor is called a "point-spread function" (PSF). As used herein, a "diffraction-pattern generator" is a structure that produces PSFs for light within the wavelength band of interest, and for a range of orientations of interest. In this one-dimensional example, the orientation of interest is perpendicular to the boundaries of odd symmetry.

Figure 2:
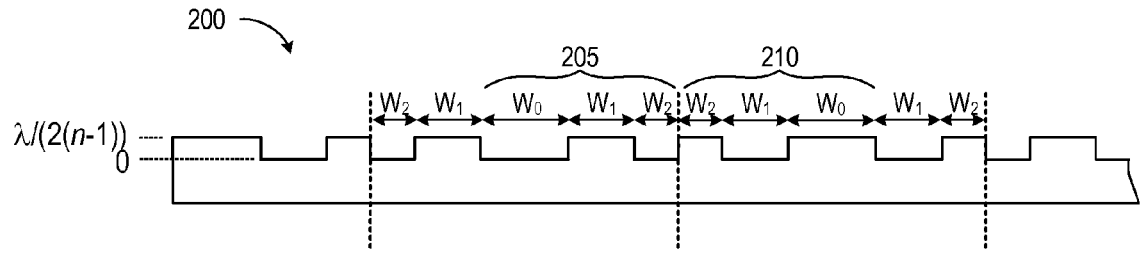
FIG. 2 depicts a one-dimensional, binary phase antisymmetric grating 200 in accordance with one embodiment.

FIG. 2 depicts a one-dimensional, binary phase antisymmetric grating 200 in accordance with one embodiment. The upper features of grating 200 are at a height $\lambda/(2(n-1))$, sufficient to induce one-half wavelength of retardation in the band of interest relative to lower features, or $\pi$ radians of relative phase delay. Features 205 and 210 on either side of each boundary exhibit odd symmetry with three differently sized segments $W_0$, $W_1$, and $W_2$. With this arrangement, paired segments (e.g., $W_0$ within features 205 and 210) induce respective phase delays that differ by approximately half a wavelength over the wavelength band of interest.

Figure 3A:
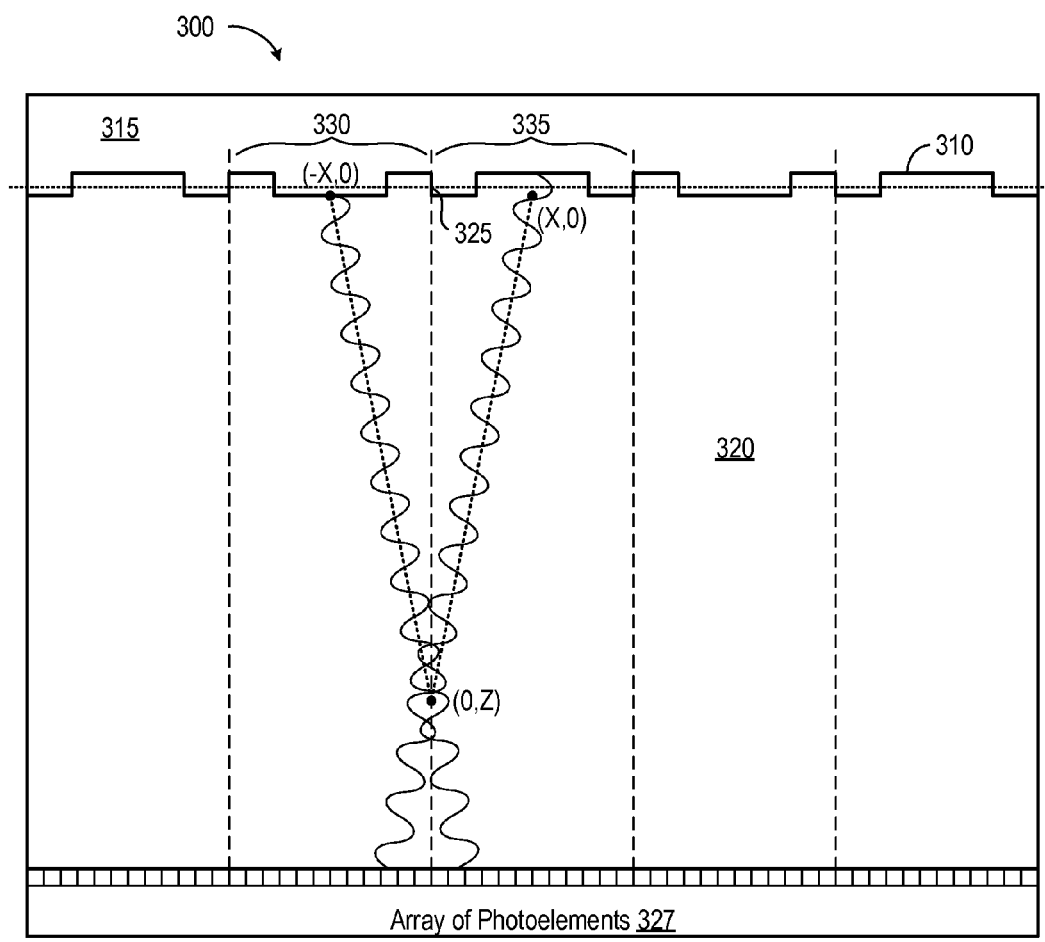
FIG. 3A depicts an imaging device 300 in accordance with an embodiment in which a binary, phase antisymmetric grating 310 is formed by an interface between light-transmissive media of different refractive indices.

FIG. 3A depicts an imaging device 300 in accordance with an embodiment in which a binary, phase antisymmetric grating 310 is formed by an interface between light-transmissive media of different refractive indices, a polycarbonate layer 315 and optical Lanthanum dense flint glass 320 in this example. Each of four boundaries of odd symmetry 325 is indicated using a vertical, dashed line. As in the foregoing examples, the upper features of grating 310 induce phase retardations of half of one wavelength ($\pi$ radians) relative to lower features. Features 330 and 335 on either side of each boundary exhibit odd symmetry. With this arrangement, paired features induce respective phase delays that differ by approximately half a wavelength over the wavelength band of interest.

Due to dispersion, the difference in the refractive index of polycarbonate layer 315 and Lanthanum dense flint glass layer 320 is an increasing function of wavelength, facilitating a wider wavelength band of interest over which the phase delay is approximately π radians. These elements produce an interference pattern on an analyzer layer 327 (e.g., a conventional photodiode array) in the manner detailed in connection with FIGS. 1A and 1B.

This example assumes light incident the light interface of device 300 is normal to the transverse plane of phase grating 310, in which case light fields that enter grating 310 equidistant from a one of the boundaries of odd symmetry 325, such as at locations (−X,0) and (X,0), are out of phase at points beneath array 310 (e.g., point (0,Z)), and thus destructively interfere to produce curtains of minimum intensity (e.g., curtains 140 of FIG. 1). Neither the depth Z nor the wavelength of light over a substantial spectrum significantly influences this destructive interference. Constructive interference similarly produces foci of maximum intensity (e.g., foci 145 of FIG. 1). Both the high and low features admit light, which provides relatively high quantum efficiency relative to gratings that selectively block light.

The following discussion details phase gratings in accordance with examples described in P. R. Gill and D. G. Stork, "Lensless Ultra-Miniature Imagers Using Odd-Symmetry Spiral Phase Gratings," in Imaging and Applied Optics, J. Christou and D. Miller, eds., OSA Technical Digest (online) (Optical Society of America, 2013). In that article, Gill and Stork describe a phase grating formed by a high-n, low-dispersion substrate and a low-n, high-dispersion coating that can introduce approximately λ-independent phase shifts in all normally incident visible light. Similar gratings are discussed above. If there exist certain points p on this interface that satisfy the following symmetry in their transmission t(•) and phase retardation φ(•), $$t(p+y)=t(p-y)\forall y \quad (1)$$

$$\phi(p+y)=\phi(p-y)+\pi+2n\pi \forall y, n \in \{0,\pm1,\pm2,\ldots\} \quad (2)$$

where y is a horizontal translation transverse to the grating direction, then the grating has phase antisymmetry about points p, and light will interfere destructively below p, regardless of λ and depth z.

A linear phase antisymmetric grating above a photosensor array could pass information from a single spatial orientation of features in the far field (transverse to the grating orientation). However, to capture information about arbitrarily oriented features of a complex scene, it is preferable to have a complete distribution of orientations in the diffractive optic. More generally, if the point-source responses (PSRs) are approximately spatially invariant, the transfer function of the imager approximates convolution with the PSR function. In such a case, the PSR should have significant power at all 2D spatial frequencies to make the inversion problem of image recovery well-conditioned.

In one example provided in Gill and Stork, gratings were numerically optimized to focus visible light onto a photodetector array 100 μm below. Optical simulations estimated the imaging performance of such a device from a 60×60 pixel array with 2.2 μm pitch 100 μm below the gratings with the sensor illuminated by a complex scene far (»100 μm) from the sensor. The resultant photocurrent from the pixel array was unintelligible when digitized and viewed directly as a digital image; however, the scene was reconstructed to a higher resolution than possible using a much larger PFCA using Tikhonov regularization. Gill and Stork report that compressed sensing techniques could be applied to improve the reconstruction quality if the scene is known to have a compressible structure. Compressed sensing could be especially advantageous if small gaps in the Fourier transform of the PSR exist.

Figure 3B:
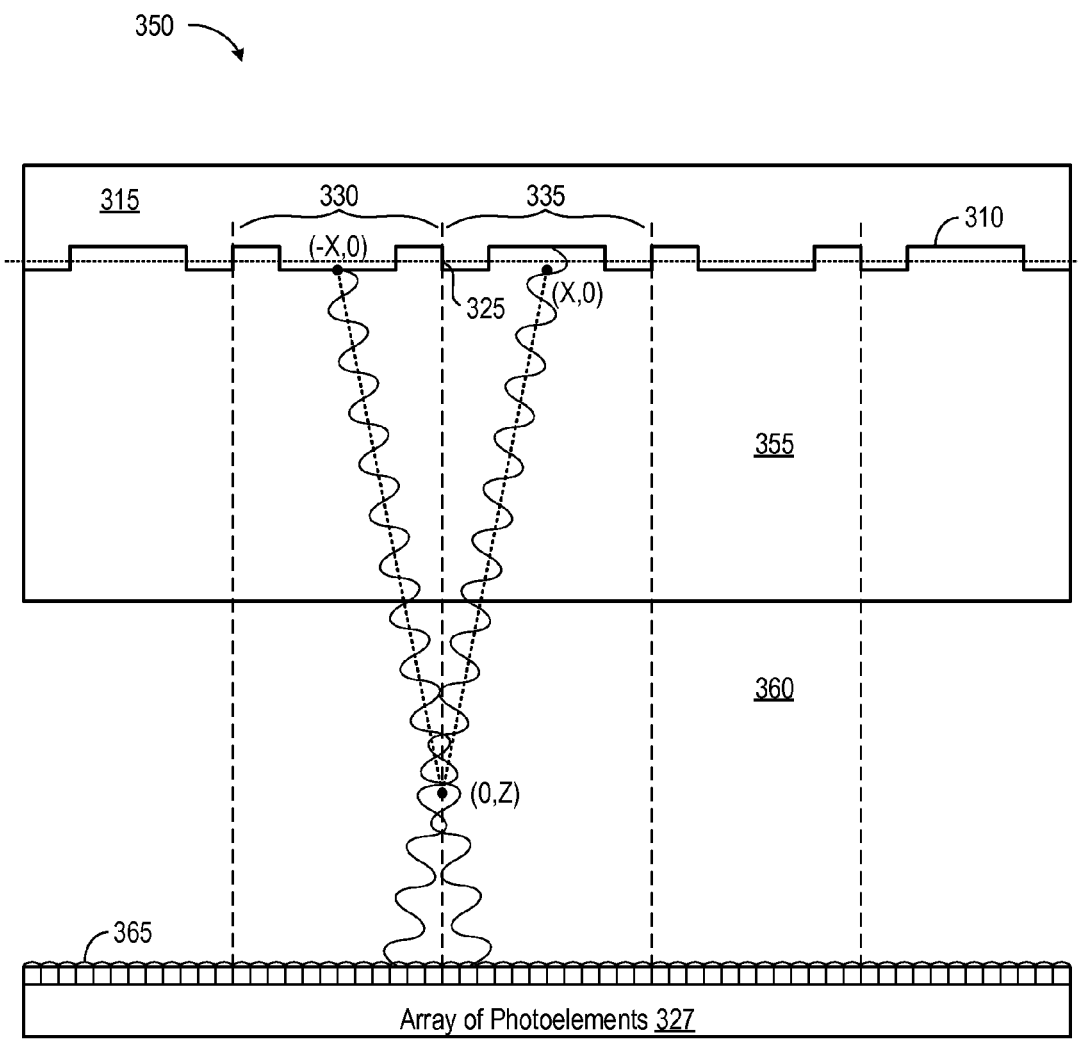
FIG. 3B depicts an imaging device 350 similar to device 300 of FIG. 3A, but equipped with an array of microlenses 365 disposed over the photoelements.

FIG. 3B depicts an imaging device 350 similar to device 300 of FIG. 3A, with like-identified elements being the same or similar. In this embodiment the light-transmissive media between grating 310 and analyzer layer 327 includes a flint glass layer 355 and an air interface 360 over an array of microlenses 365. Lenses 365 are, in turn, disposed over analyzer layer 327 to focus light onto the photoelements. Each lens 365 is coincident with a single photoelement in this example. The refractive index of interface 360 matches that of the medium through which light travels from objects in an imaged scene to device 350.

As shown in FIGS. 1A and 1B, as plane-wave light shifts away from a normal direction, a corresponding shift in the locations of minima and maxima on the underlying pixel array results. For far-field imaging, where light from each scene feature is approximately planar, it is expected that movement of a scene feature will then produce a detectable shift in the curtain pattern on the underlying sensor. It has now been found that raw sensor images from typical scenes that receive light from a large number of scene features can be used to accurately detect scene shifts caused by panning or x or y shifting of the imager, movement of all of the scene or scene elements in an x or y direction, etc. Further, some imager embodiments can distinguish differences in left/right, top/bottom, or quadrant motion, extending applications to detection of motion in a z-direction.

Figure 4A:
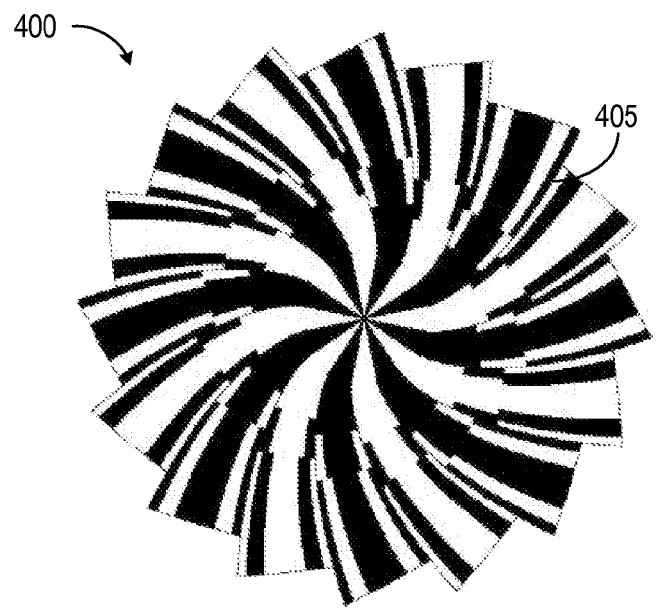
FIG. 4A is a plan view of a grating 400 in accordance with another embodiment.
Figure 4B:
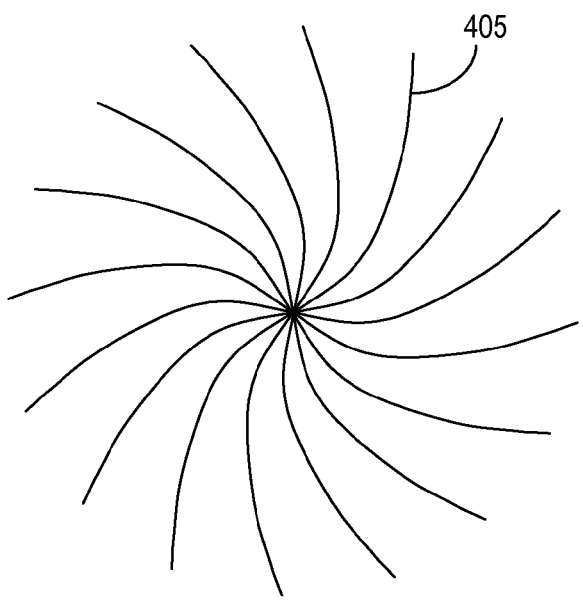
FIG. 4B depicts boundaries 405 of grating 400 of FIG. 4A.

FIG. 4A is a plan view of a grating 400 in accordance with another embodiment. Recalling that relatively narrow (wide) segment spacing works better for relatively high (low) frequencies, feature spacing increases along odd-symmetry boundaries (between elevated and recessed grating regions, represented by dark and light) with distance from the center. Curved boundaries of odd symmetry 405 extend radially from the center of the grating to the periphery, radiating out between the dark (elevated) and light (recessed) arms near the center. The curved boundaries are obscured by grating features in FIG. 4A, so the shapes of boundaries 405 are depicted in FIG. 4B for ease of review.

The segment widths do not continue to increase with radius, as there is a maximum desired width for a given wavelength band of interest (e.g., the widest may correspond to the lowest frequency of visible red light). The features that define boundaries 405 therefore exhibit discontinuities as they extend toward the periphery of grating 400. In this example, grating 400 has three discrete areas each tuned to a subset or all of the wavelengths in the band of interest.

FIG. 5A shows an image sensor 500 imaging a scene element that moves from a first scene position SP1 to a second scene position SP2 to illustrate how one embodiment can be used to detect and measure motion. The motion in the scene may be a part of the scene, a car moving through the field of view for example. Alternatively, the entire scene may be moving with respect to the camera, as would happen when a fluid is flowing across a camera's field of view or if the camera is panned.

Image sensor 500 includes grating 400 of FIG. 4 deposed in parallel with a photosensor array 515. Light incident grating 400 from the scene at position SP1 produces an interference pattern 505 on a photosensor array 515; light incident grating 400 from the scene at position SP2 produces a second interference pattern 510 on photosensor array 515. The scene motion produces differences between interference patterns 505 and 510, and these differences can be used to calculate the various aspects of the movement between positions SP1 and SP2.

FIGS. 5B and 5C are exemplary diffraction patterns D1 and D2 that represent consecutive frames taken by an image sensor of the type detailed above in connection with FIG. 5A as the apparent scene shifts in a largely x-direction (e.g., panning a camera in a horizontal direction). Differences between patterns D1 and D2 represent the apparent movement of the scene between frames.

FIG. 5D is a normalized cross-correlation CC of diffraction patterns D1 and D2 of FIGS. 5B and 5C. Cross-correlation CC includes a peak 525, the location of which yields an estimate of the overall angular/translational shift between the diffraction patterns D1 and D2. (A second, less intense peak 530 can be filtered out or ignored using algorithms discussed below.) The estimate of angular shift is sufficient to measure simple x/y translational and/or panning optical flow, and is accurately obtained without the computationally complex process of constructing images from the diffraction patterns. This method, with the accompanying sensor, can be expected to yield estimates superior to traditional camera-based methods when the moving sources are punctate, since the phase grating distributes point-source signals across a wider range of the sensor to produce a larger number of (informative) spatial edges. For example, a typical camera resolves a point source as a blurred dot that covers one or a collection of neighboring pixels, whereas sensor 410 resolves a point source as a large complex diffraction pattern rich in spatial edges. This extra spatial information can be used to better resolve shifts in the angular position of the point source for purposes of cross-correlation, without ever transforming the raw data to reconstruct a "focused" version of the point source.

Figure 5E:
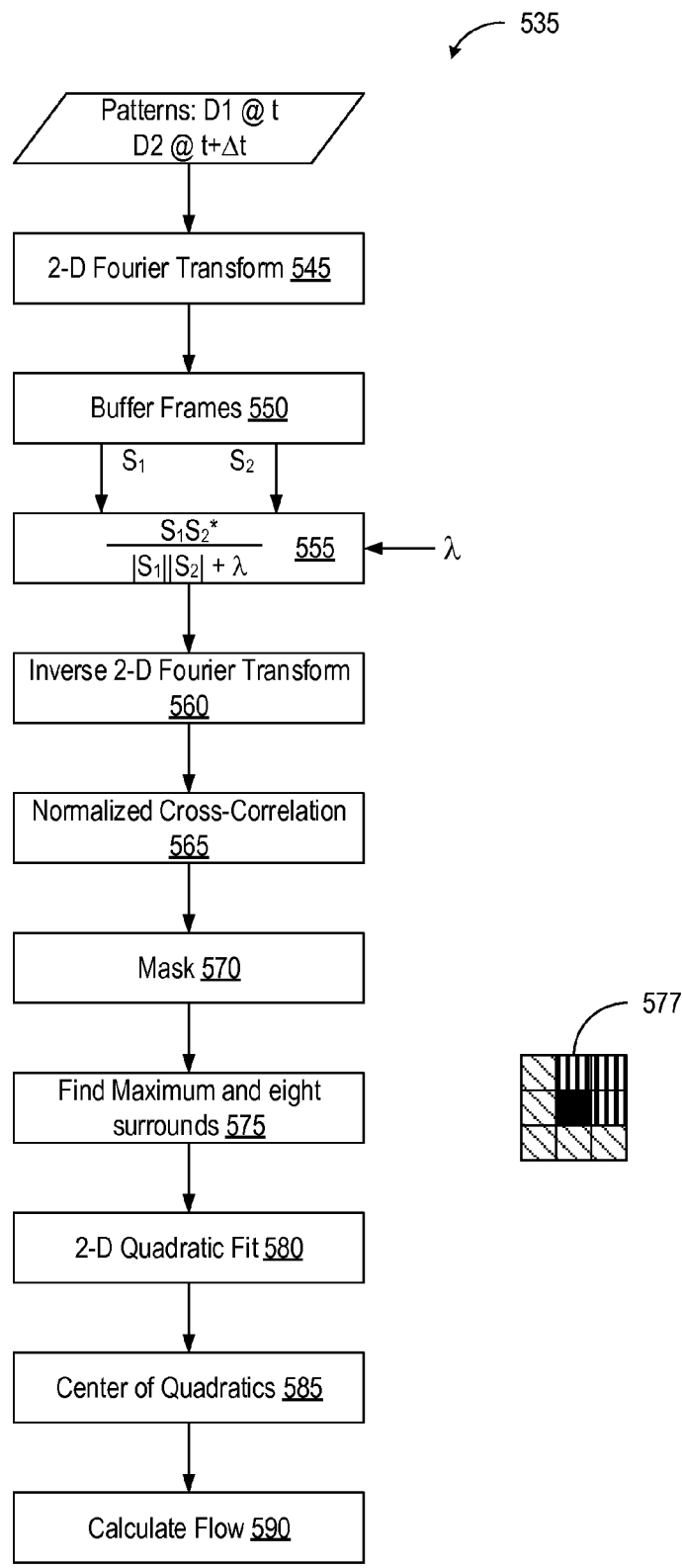
FIG. 5E is a flowchart 535 illustrating a method of measuring flow using e.g. the setup of FIG. 5A.

FIG. 5E is a flowchart 535 illustrating a method of measuring flow using e.g. the setup of FIG. 5A. Further, while the scene or objects within the scene move relative to the image sensor in this example, image sensors can also be used to sense and measure camera motion separate from or relative to the scene.

To begin, frames of diffraction patterns D1 and D2, captured by sensor 510 at times t and t+Δt, are treated to a 2-D Fourier transform (545), and the resultant frequency domain frames, $S_1$ and $S_2$, are buffered (550) in a frame buffer (not shown). Frames $S_1$ and $S_2$ and a noise-dependent regularization factor λ are used to calculate the Fourier transform of a cross-correlation function (555). In this example, the product of $S_1$ and $S_2^*$, the complex conjugate of frequency domain frame $S_2$, is divided by the product of the absolute values of frequency domain frames $S_1$ and $S_2$ plus regularization factor λ. The regulation factor is selected to minimize the impact of spurious image artifacts. The resultant function is then subjected to an inverse 2-D Fourier transform (560) to yield a cross correlation normalized by the autocorrelation of the scene (565).

The inverse Fourier transform of 555 should yield peaks like that of FIG. 5D. A mask based on maximum expected shift rates can be applied to exclude potentially erroneous artifacts in the normalized image (570). If flow is constrained to a direction and/or a maximum possible rate, for example, image peaks that correspond to disallowed directions and/or rates can be excluded from consideration.

Like each frame, the normalized cross-correlation is represented as a 2-D array of pixels. The brightest pixel can be identified as the peak correlation, corresponding to the scene shift between frames. Alternatively, a more accurate measure can take additional pixels into account. In the example of FIG. 5E, the pixel representing a maximum intensity is considered in concert with the neighboring eight pixels (575) to achieve sub-pixel spatial resolution. The process performs a 2-D quadratic fit (580) on the intensity values of the most-intense and neighboring eight pixels 577. The cross-correlation is then calculated to be the center of the quadratics (585), and this spatial information corresponds to the angular displacement of diffraction patterns D1 and D2. The angular displacement is then related to the spatial displacement of the scene in two dimensions. The optical flow rate and heading can be calculated using the spatial displacement and the temporal separation between the capturing of diffractions patterns D1 and D2 (590).

The foregoing procedure is illustrative, and other methods can be used to extract useful information from captured diffraction patterns. In an alternative method of calculating the normalized cross-correlation of frames $S_1$ and $S_2$, for example, the cross-correlation $S_1 S_2^*$ can be normalized by dividing the cross-correlation by the square root of the product of the autocorrelations of $S_1$ and $S_2$. A regularization factor can be used as noted previously. The cross-correlation can be calculated in the spatial domain. This may be more computationally efficient when the expected motion can be limited to a small range of possibilities. For instance, where the allowable motion has some predictability and/or is being tracked using a Kalman filter or similar approach, the next raw signal shift can be predicted, and a small correlation search can be conducted just around this area.

Figure 5F:
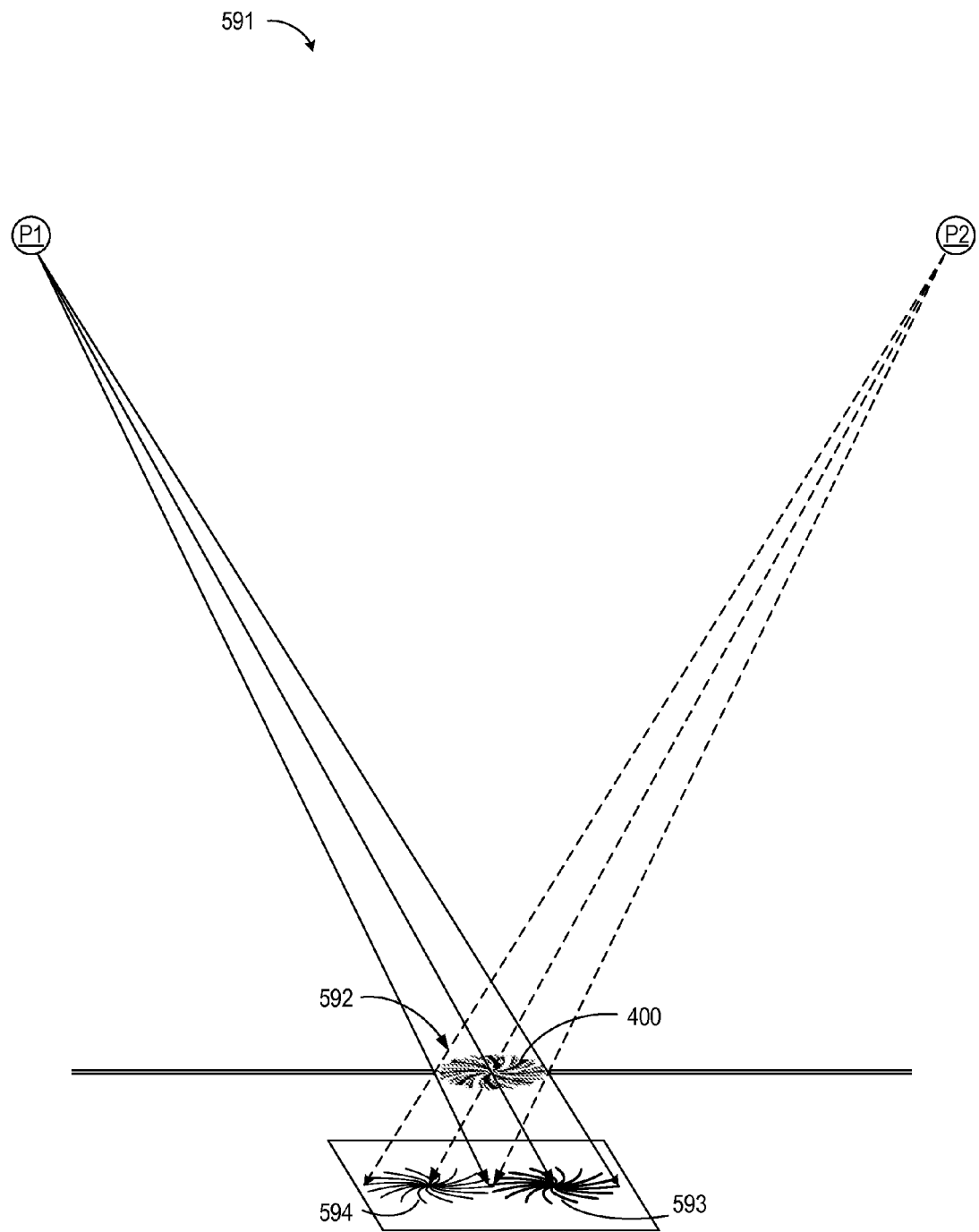
FIG. 5F depicts an imaging system 591 in which grating 400 of FIGS. 4 and 5A-B is used in conjunction with an aperture 592 for improved angle sensitivity and spurious light rejection.

FIG. 5F depicts an imaging system 591 in which grating 400 of FIGS. 4 and 5A-B is used in conjunction with an aperture 592 for improved angle sensitivity and spurious light rejection. Light from a point source P1 on the left produces an interference pattern 593 at the right, whereas light from a point source P2 on the right produces an interference pattern 594 at the left. Aperture 592 blocks rays from sources P1 and P2 that would interfere with patterns 593 and 594, resulting in improved angle sensitivity. The increased angle sensitivity can be used to advantage in e.g. motion detection and measurement.

Figure 5G:
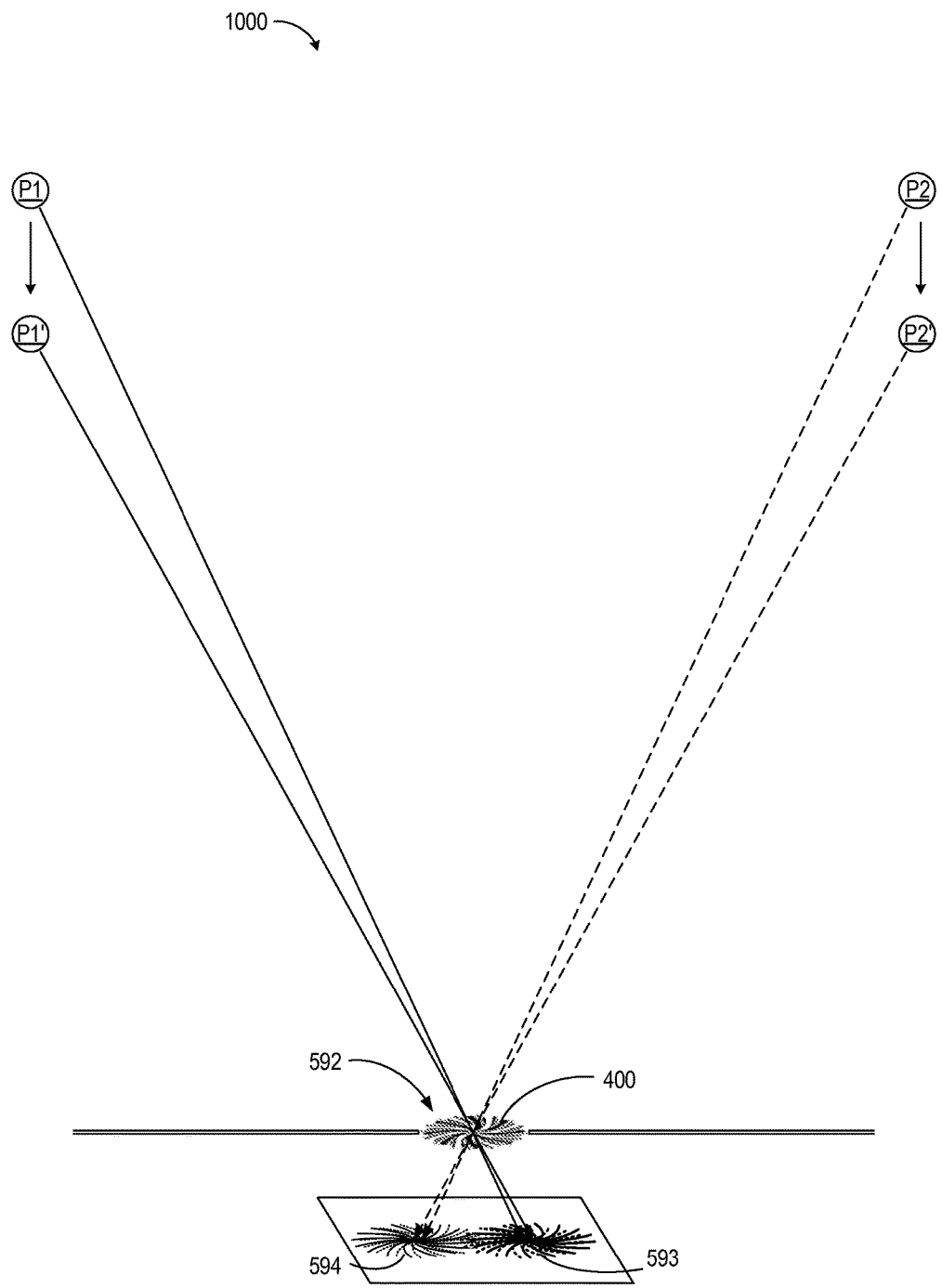
FIG. 5G depicts imaging system 591 of FIG. 5F in a manner that illustrates how angle sensitivity can be used to sense looming.

FIG. 5G depicts imaging system 591 of FIG. 5F in a manner that illustrates how angle sensitivity can be used to sense looming (motion toward and away from the sensor). As point sources P1 and P2 move closer to grating 400, or vice versa, the separation between interference patterns 593 and 594 increases. The change in separation can be sensed or measured to sense or measure motion toward and away from grating 400.

Generally, panning and/or x/y translation can be discovered using a two-dimensional cross-correlation of the entire imaged sensor area. For looming, however, one technique is to consider the sensor area separately for left/right, top/bottom, or quadrants, and then perform cross-correlation on each area with itself in the second frame. For simple left/right estimation, the average of the left and right correlation estimates can be considered as an estimate of left/right translation, and the difference between the left and right correlation estimates can be considered as an estimate of the extent to which scene elements are moving towards or away from, or remaining at roughly the same distance from, the imager.

A pair of temporally adjacent captured patterns D1 and D2 is used in the examples of FIGS. 5B-G. The patterns need not be adjacent in time, however, and more than two can be considered. Moreover, one of the patterns can be a reference pattern in lieu of captured data.

A one-dimensional sensor may be preferred, such as when the flow under consideration is constrained to one dimension. Such sensors can be relatively small and inexpensive, and the requisite calculations relatively simple. For instance, the antisymmetric phase gratings in such an embodiment can each be arranged perpendicular to the direction of expected flow (e.g., phase edges are aligned in a columnwise direction with the image sensor). For a given frame, the contributions from each column are then summed for all rows. Two frames can then be correlated, either in the spatial or frequency domain, using one-dimensional operations.

Figure 6:
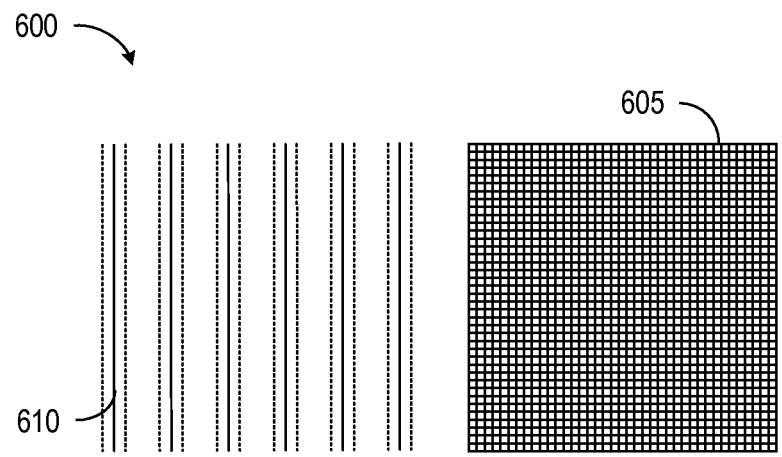
FIG. 6 depicts a grating 600 and associated photodiode array 605 for a one-dimensional motion sensor.

FIG. 6 depicts a grating 600 and associated photodiode array 605 for a one-dimensional motion sensor. Grating 600 has parallel odd-symmetry boundaries 610, which may have features of the same or different widths can all be similar, or of varying widths along one or more boundaries in order to optimize different regions for different wavelengths. Parallel boundaries with the requisite diversity of widths and spacings to sample a sufficient number of spatial frequencies can image one-dimensional images, e.g., barcodes. Array 605 is shown alongside, rather than below, grating 600 for ease of illustration.

Figure 7:
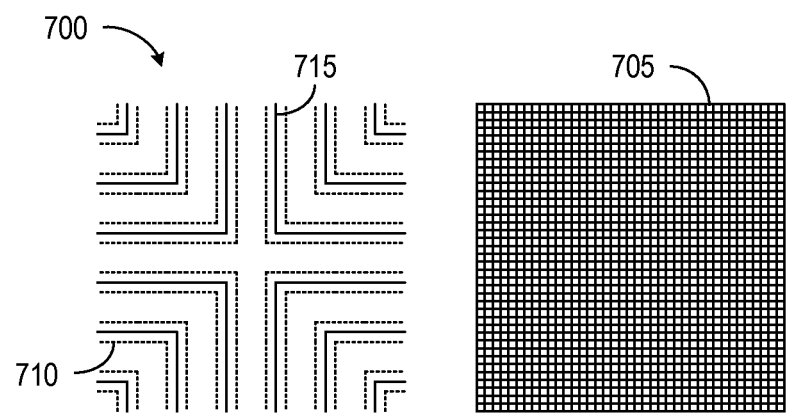
FIG. 7 is a plan view of a sensor 700 in accordance with another embodiment where a single sensor measures both X and Y motion, but two one-dimensional calculations are used to determine X and Y motion.

Two one-dimensional sensors can be used together to detect both X and Y motion. Alternatively, FIG. 7 is a plan view of a sensor 700 and associated photodiode array 705 in accordance with another embodiment where a single sensor measures both X and Y motion, but two one-dimensional calculations are used to determine X and Y motion. Sensor 700 has some phase-antisymmetric features 710 aligned in a row direction with the underlying sensor, and some phase-antisymmetric features 715 aligned in a column direction with the underlying sensor. For detection of X motion, each column of pixels is summed for each frame, and for detection of Y motion, each row of pixels is summed for each frame. The one-dimensional sums can each be cross-correlated with respective sums from a second frame. Note that although both X and Y sums contain X and Y information, the "X" information in the row sums, for instance, does not change appreciably as the scene shifts left to right, and thus effects more of a baseline level for the correlation than the peak of the correlation.

Figure 8A:
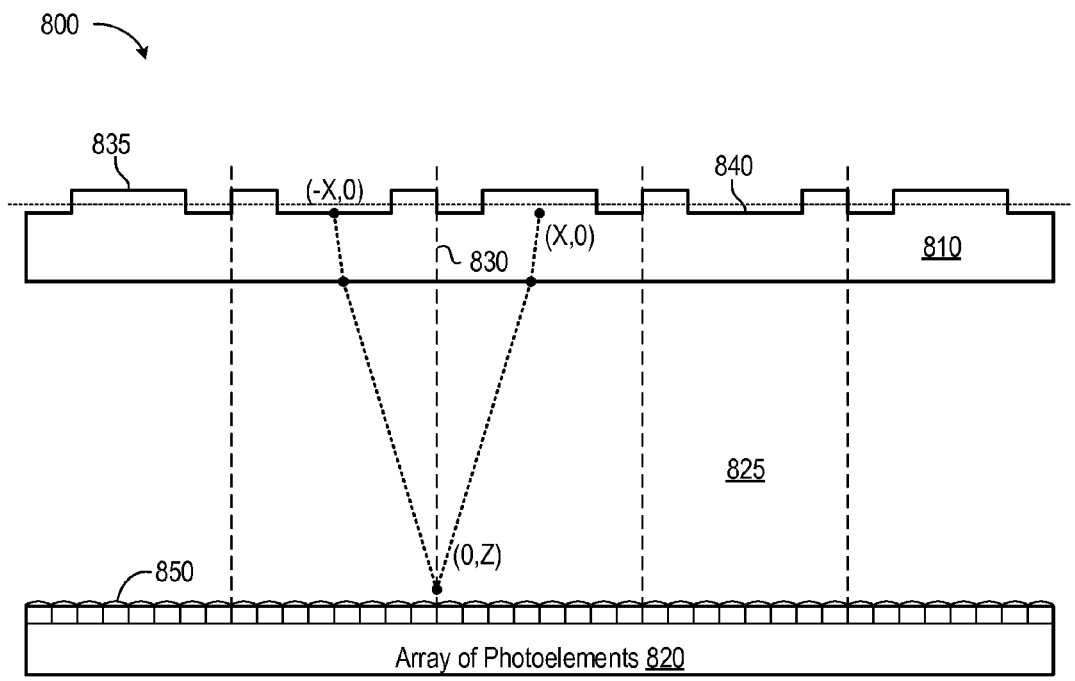
FIG. 8A depicts an infrared sensor 800 in accordance with an embodiment in which a binary, phase antisymmetric grating 810 of a high-density polyethylene (HDPE) is separated from an array of photoelements 820 by an air interface 825.

FIG. 8A depicts an infrared sensor 800 in accordance with an embodiment in which a binary, phase-antisymmetric grating 810 of a high-density polyethylene (HDPE) is separated from an array of photoelements 820 by an air interface 825.

Each of four boundaries of odd symmetry 830 is indicated using a vertical, dashed line. These elements produce an interference pattern on array 820 in the manner detailed in connection with FIGS. 1A and 1B. An array of lenses 850 may be included, in which case each lens may be coincident with a single photoelement.

This example assumes light incident the light interface of grating 800 is normal to the transverse plane of phase grating 810, in which case light fields that enter grating 810 equidistant from a one of the boundaries of odd symmetry 830, such as at locations (−X,0) and (X,0), are out of phase at points beneath array 810 (e.g., point (0,Z)), and thus destructively interfere to produce curtains of minimum intensity (e.g., curtains 140 of FIG. 1).

Phase grating 810 is much less than one millimeter thick, and thus admits most of the incident infrared (IR) light. The refractive index of HDPE for 10 µm IR radiation is approximately 1.54. Thick regions 835 of grating 810 are 10 µm taller than thin regions 840, and thus introduce approximately a half-wavelength retardation compared to thin regions. In this example, grating 810 is 50 µm thick at its thickest and 40 µm thick at its thinnest, and the separation between grating 810 and the underlying IR sensor 820 (for instance, a microbolometer) is 2 mm. The air gap between grating 810 and array 820 allows the grating to be thin, which advantageously limits IR absorption.

Figure 8B:
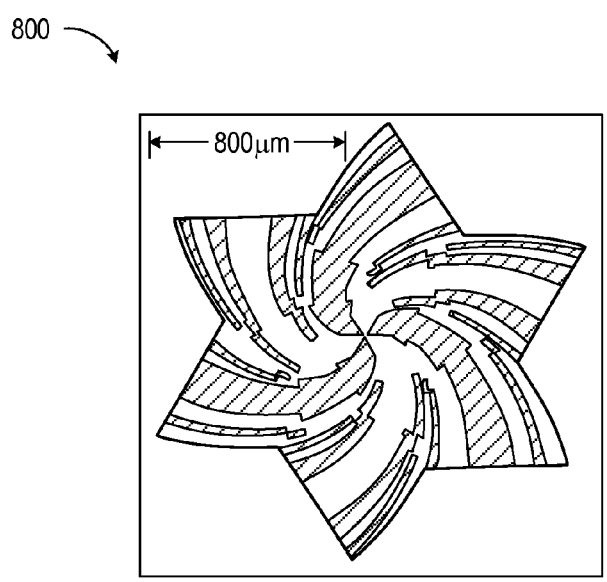
FIG. 8B is a plan view of grating 800 in accordance with an embodiment for IR imaging as in FIG. 8A.

FIG. 8B is a plan view of grating 800 in accordance with an embodiment for IR imaging as in FIG. 8A. Grating 800 is similar to grating 400 of FIGS. 4A and 4B, but with larger dimensions optimized for the longer wavelength of IR light as compared with the visible spectrum. As in the prior example, relatively narrow (wide) segment spacing works better for relatively high (low) frequencies, and feature spacing increases along odd-symmetry boundaries (between dark and light regions) with distance from the center. The microbolometer in this embodiment measures 2 mm by 2 mm, and the pattern on the film is a single 6-arm spiral. The pixel pitch of array 820 is 33.3 µm. An IR embodiment such as shown in FIGS. 8A and 8B can thus be used to estimate motion of heat signatures in an imaged area.

Figure 9:
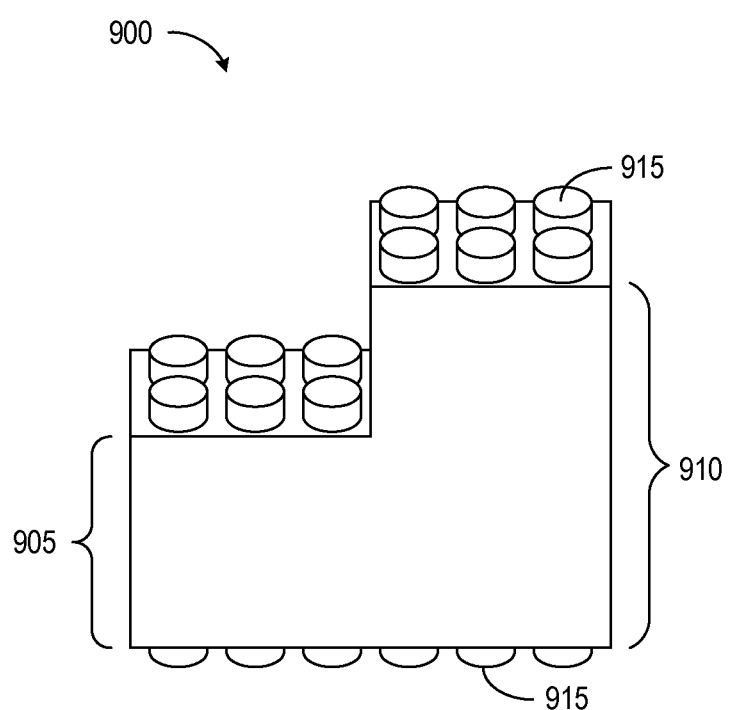
FIG. 9 shows a portion of a grating 900, showing relatively thin and thick areas 905 and 910, in accordance with another embodiment.

FIG. 9 shows a portion of a grating 900, showing relatively thin and thick areas 905 and 910, in accordance with another embodiment. Grating 900 is e.g. molded HDPE, and includes arrays of micro-pillars 915 on the top and bottom surfaces. In one embodiment of a sensor that employs such a grating, each micro-pillar 915 is 2 µm tall and 3 µm wide, and the collection of pillars covers 45% of the surfaces. The pillar dimensions are smaller than the wavelength of IR light, so they collectively act like a material with an intermediate refractive index. The collections of micro-pillars 915 act as quarter-wavelength antireflective coatings to the n=1.54 plastic HDPE film. A microbolometer used in this sensor can have a 33.3 micron-pitch, 240×240 pixels, making it 8 mm by 8 mm. Grating 900 is 12 mm by 12 mm, centered over the microbolometer, and is separated from the microbolometer by 4 mm. For the IR sensor in accordance with the device described in FIG. 9, individual grating features may be 41% larger than for the device of FIG. 8 (twice the height, so the gratings are the square of root 2 times as wide), and approximately 18 whole spirals fit into the 12×12 mm area.

Figure 10:
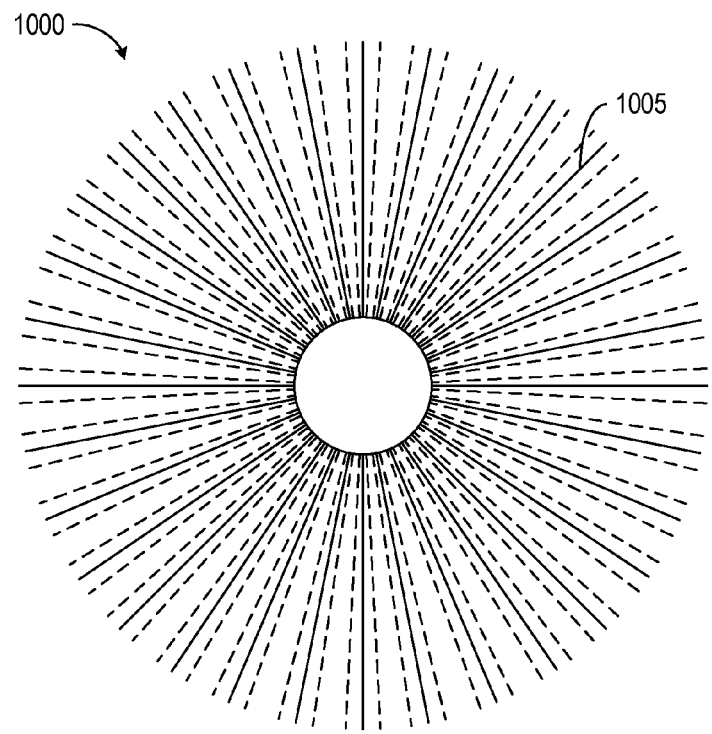
FIG. 10 is a plan view of a grating 1000 in accordance with an embodiment in which boundaries of odd symmetry 1005 extend radially from the center of the grating, and in which the widths of the feature segments widen gradually away from the center.

FIG. 10 is a plan view of a grating 1000 in accordance with an embodiment in which boundaries of odd symmetry 1005 extend radially from the center of the grating, and in which the widths of the feature segments widen gradually away from the center. Grating 1000 captures image information at sixteen discrete angles with a continuously variable set of widths. While convenient to draw grating 1000 as a circle, other shapes may be used. In some embodiments, for example, collections of gratings are arrayed over a photodiode array. In such cases grids that share common boundaries (e.g., such as hexagonal, square, or triangular boundaries) make more efficient use of the underlying photodiodes.

Figure 11:
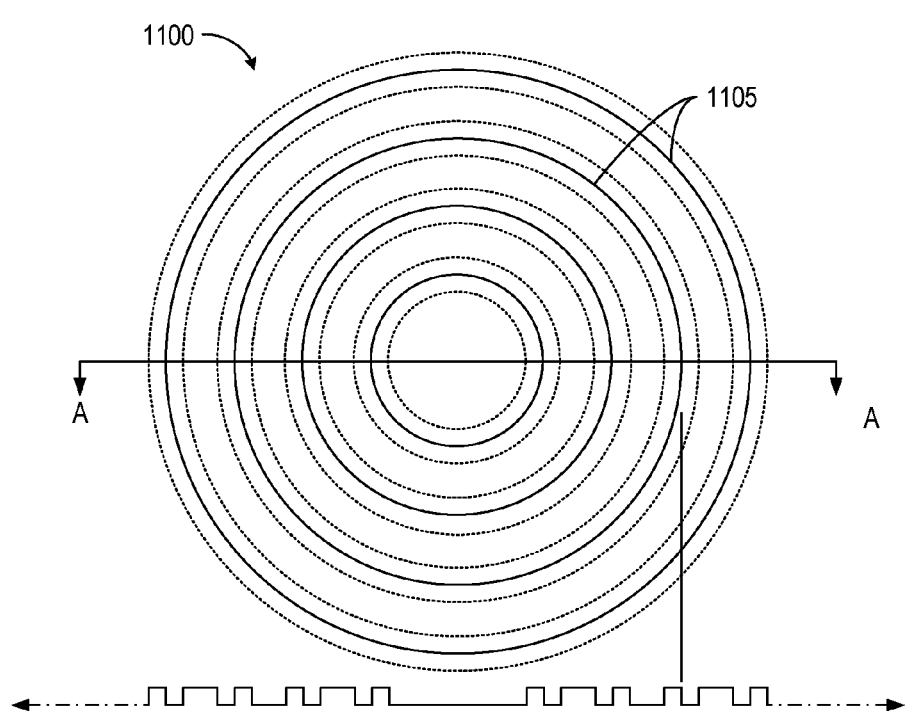
FIG. 11 is a plan view of a grating 1100 in accordance with an embodiment with concentric boundaries of substantially odd symmetry 1105, and includes a cut-away view along line A-A.

FIG. 11 is a plan view of a grating 1100 in accordance with an embodiment with concentric boundaries of substantially odd symmetry 1105, and includes a cut-away view along line A-A. In this example the widths of the feature segments are discrete and the angles are continuous. The spacing of grating 1100 appears consistent, but may be varied to allow for sharp focus for a range of wavelengths, angles of incidence, or manufacturing variations.

Figure 12:
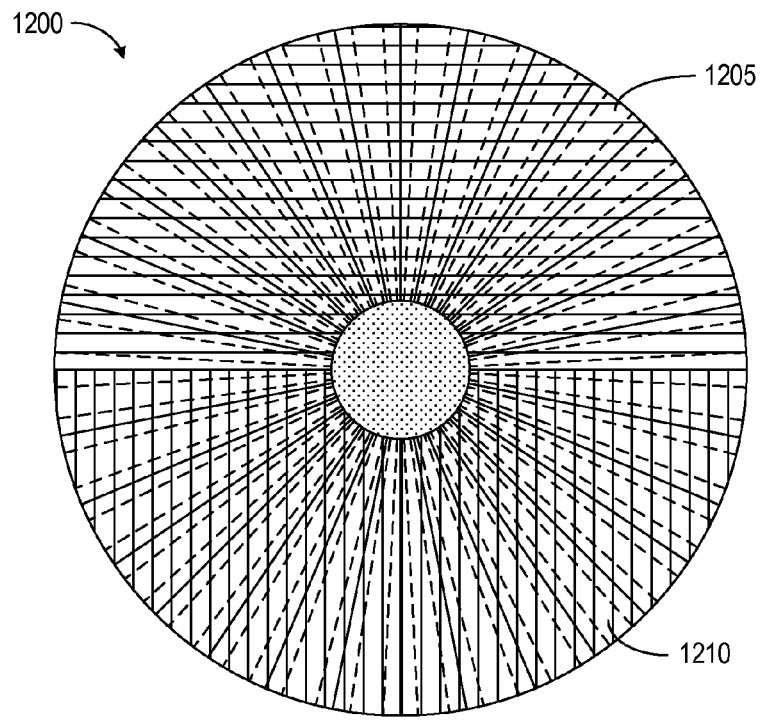
FIG. 12 is a plan view of a grating 1200 in accordance with an embodiment similar to grating 900 of FIG. 9.

FIG. 12 is a plan view of a grating 1200 in accordance with an embodiment similar to grating 1000 of FIG. 10. The two halves of grating 1000 provide essentially the same information. Grating 1200 adds half-circle polarization filters 1205 and 1210 with perpendicular orientations. Each half of grating 1200 thus produces image data specific to one of two polarizations, and these data can be used separately or together. More or fewer filters, with the same or different orientations, may be used in other embodiments. Different types of filters can also be used to cover all or a portion of gratings of the type described herein.

Figure 13:
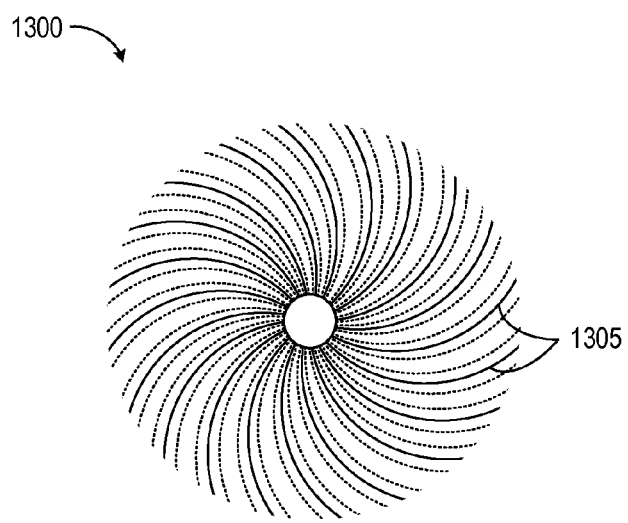
FIG. 13 is a plan view of a grating 1300 in accordance with another embodiment.

FIG. 13 is a plan view of a grating 1300 in accordance with another embodiment. Curved boundaries of odd symmetry 1305 extend radially from the center of the grating, and the widths of the feature segments widen gradually away from the center. The curvature of boundaries 1305 provide continuously varying angular information similar to what is available from grating 1100 of FIG. 11 while retaining the continuously varying spacings of grating 1000 of FIG. 10.

Figure 14A:
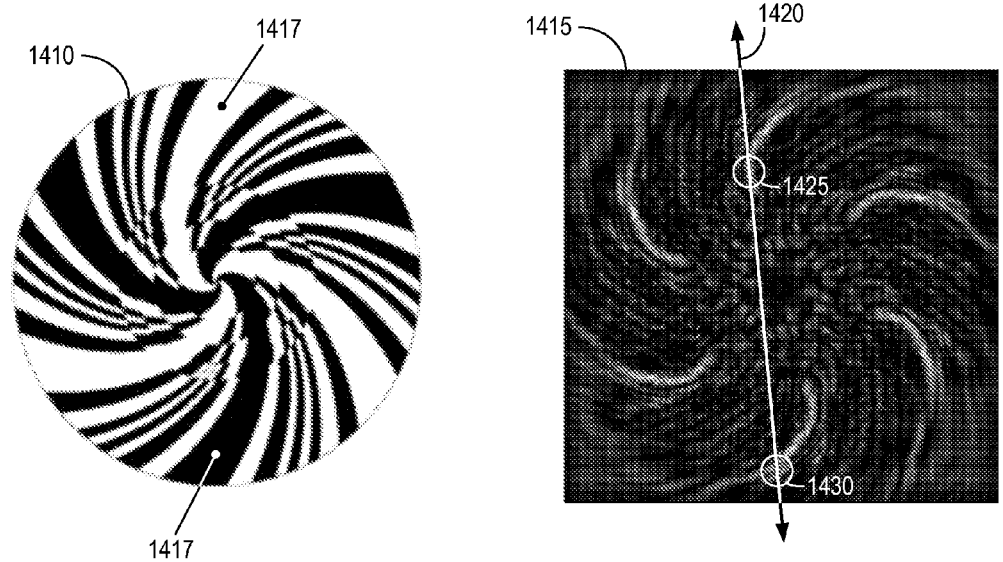
FIG. 14A includes a plan view of a spiral grating 1410, in accordance with another embodiment, accompanied by a point-spread function (PSF) 1415 for grating 1410 illuminated normally.

FIG. 14A includes a plan view of a spiral grating 1410, in accordance with another embodiment, accompanied by a point-spread function (PSF) 1415 for grating 1410 illuminated normally. (A PSF describes the response of a grating or imaging device or system to a point source or point object.) As in the example of FIG. 4A, the widths of the segments (e.g., segment 1417) do not continue to increase with radius, as there is a maximum desired width for a given wavelength band of interest. The features that define boundaries 1405 therefore exhibit discontinuities as they extend toward the periphery of grating 1410. PSF 1415 includes six spiral "arms" and other attributes that signify relatively bright areas of illumination.

When grating 1410 is disposed above a photosensor array in the manner discussed previously, the imaging ability of the resulting sensing device relies on the fact that light from different incident angles illuminates different groups of pixels in the photosensor array. Location discrimination can be improved when the correlation of corresponding PSFs is large. When a grating segment produces linear features in its PSF, moving the light source in a direction parallel to this linear feature does not change the signal observed at pixels close to the feature; such a grating may therefore rely on other features to discriminate motion in a direction parallel to that feature. Referring to PSF 1415, for example, an area 1425 with features relatively parallel to line 1420 would offer little sensitivity to position along line 1420, whereas an area 1430 with features relatively perpendicular to line 1420 would more clearly discriminate position along line 1420.

Figure 14B:
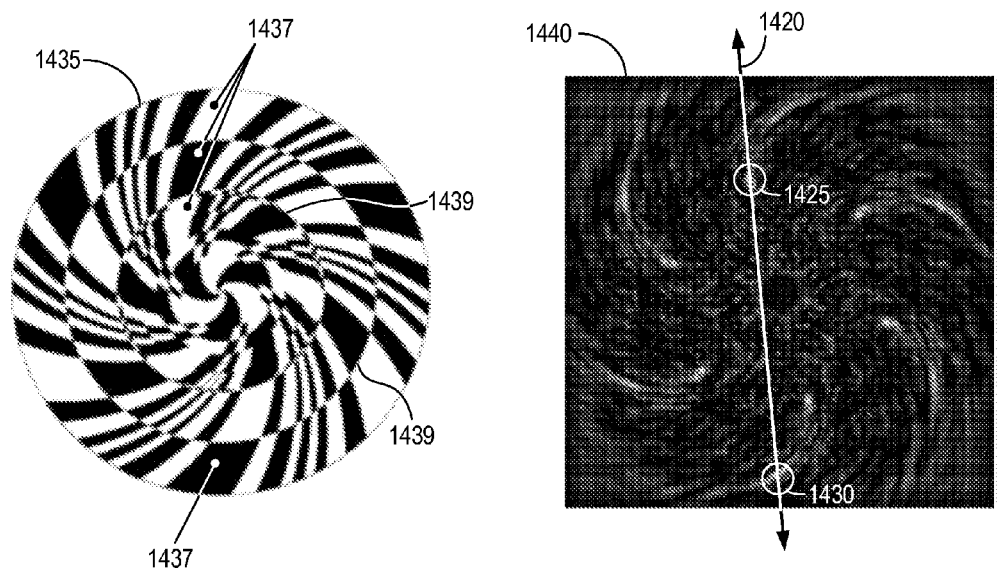
FIG. 14B includes a plan view of a spiral grating 1435 similar to grating 1410 of FIG. 14A, but modified to produce more distinctive collections of illuminated pixels.

FIG. 14B includes a plan view of a spiral grating 1435 similar to grating 1410 of FIG. 14A, but modified to produce more distinctive collections of illuminated pixels. In general, gratings that produce more distinctive collections of illuminated pixels, and preserve full Fourier information of an imaged scene, perform better than gratings where several pixels of the photosensor receive the same signal for a range of incident angles. As compared with grating 400 in FIGS. 4A and 4B, the spiral segments are divided into sub-segments 1437 that represent phase reversals. Phase-reversing boundaries 1439 between sub-segments are roughly orthogonal to the lines of odd symmetry, and serve to perturb otherwise smooth, relatively linear features. This effect can be seen in PSF 1440 of FIG. 14B, an interference pattern that results from grating 1435 being illuminated as in the example of FIG. 14A. Line 1420 and areas 1425 and 1430 introduced in FIG. 14A are similarly imposed over PSF 1440. In this case, however, features of relatively high image intensity are segmented by the phase reversals of the segments 1437 in grating 1435. As a consequence, area 1425 includes features with edges both parallel and perpendicular to line 1420. The addition of perpendicular edges would increase sensitivity to position along line 1420 for area 1425.

The example of FIG. 14B illustrates that one way to perturb otherwise smooth, linear PSF features is to invert the phase of the grating in alternate zones whose boundaries are roughly orthogonal to the lines of odd symmetry in the design (equivalently, in lines roughly perpendicular to the curvilinear features in the PSF), and thus to the concomitant curtains of minimum intensity. Then, otherwise smooth linear PSF features have their light directed away from these new phase boundaries, yet phase antisymmetry is preserved. For illustrative purposes, these zones are equally spaced and are strictly radial. Different spacings could be optimal for different wavelengths and sensor-grating spacings, and the zones could take other forms.

Gratings 1410 and 1435 each includes six segments, 1417 and 1435, respectively, that extend from the center toward the periphery. Increasing the number of segments to sixteen, as in grating 400 of FIG. 4A, for example, can produce effective gratings with straighter segments. Concentric zone boundaries in such embodiments can be made more orthogonal to the lines of odd symmetry in such embodiments, which can improve grating performance.

Figure 14C:
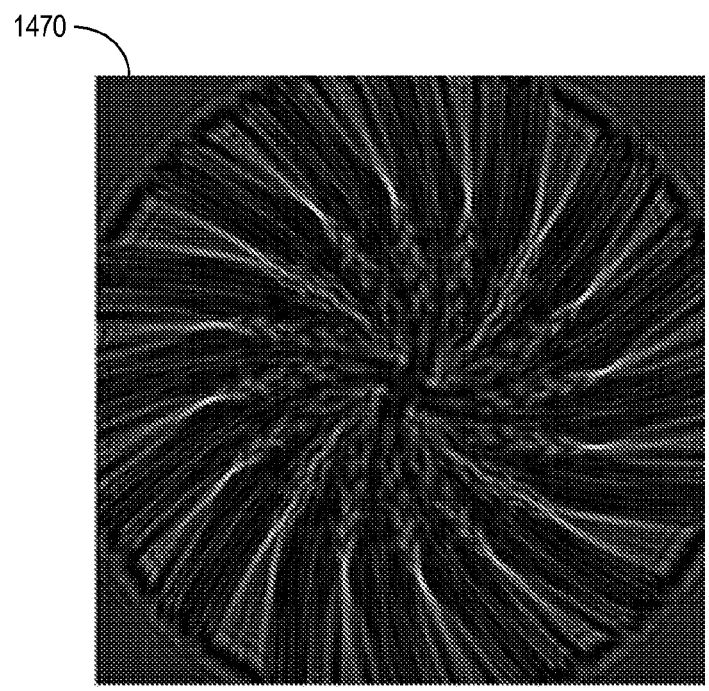
FIG. 14C is a simulated PSF 1470 for a sixteen-segment pinwheel grating similar to that shown in FIG. 4A.
Figure 14D:
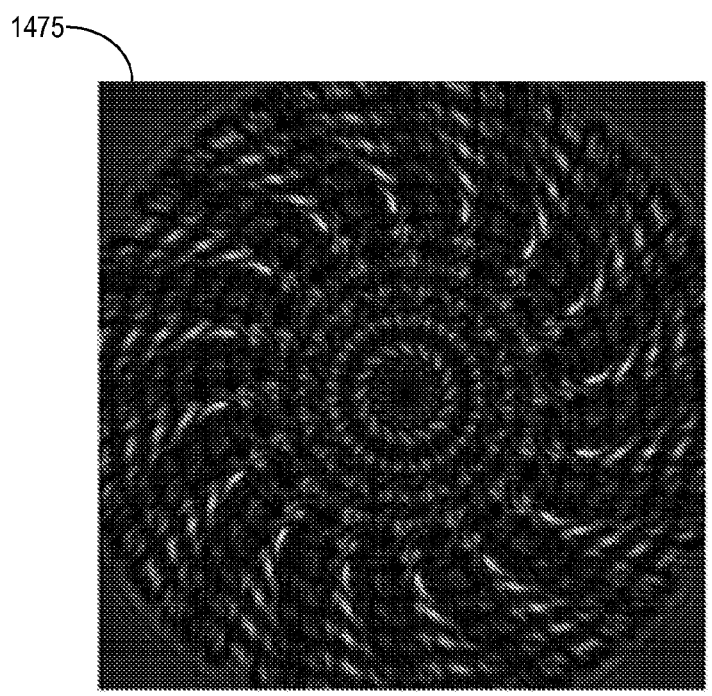
FIG. 14D is a simulated PSF 1475 for a similar sixteen-segment pinwheel grating with concentric phase reversals of the type described in connection with FIG. 14B.

FIG. 14C is a simulated PSF 1470 for a sixteen-segment pinwheel grating similar to that shown in FIG. 4A; FIG. 14D is a simulated PSF 1475 for a similar sixteen-segment pinwheel grating with concentric phase reversals of the type described in connection with FIG. 14B. The segmented "arms" of the diffraction grating segment the pattern to give additional spatial information, and can thus improve an image sensor's signal-to-noise ratio.

FIGS. 10-14B show some of the alternative antisymmetric phase grating implementations that can be used with a motion-sensing imager. Although the primary embodiments have been shown without a lens, for applications where light collection would aid in motion estimation a lens or lenses can be included. Such a lens may change the field of view considered, but should be positioned such that the grating is not at a focal point for the object ranges of interest.

Facial Presence and Recognition

Face-recognition systems are computer applications that automatically identify people, in essence answering the question "Who is this?" Such systems are used in authentication, image tagging (e.g. for text-based image search), and other areas. Face-presence systems are similar, but answer the simpler question "Is anyone present?" Face-presence detection can be used in toys, some electronic appliances, control of advertising displays, and so on. Most face-recognition systems—especially ones where high accuracy is important—rely on high-quality video images and sophisticated video equipment. Smaller, less-expensive equipment would increase the market for both image recognition and presence detection.

Lensless image sensors of the type detailed herein can be used for face recognition and presence detection. In one embodiment, for example, a gallery of face images for known people is taken using lensless image sensors. A "probe" image of an unknown face taken using the same type of lensless sensor can then be compared with the images in the gallery in search of a match.

Figure 15A:
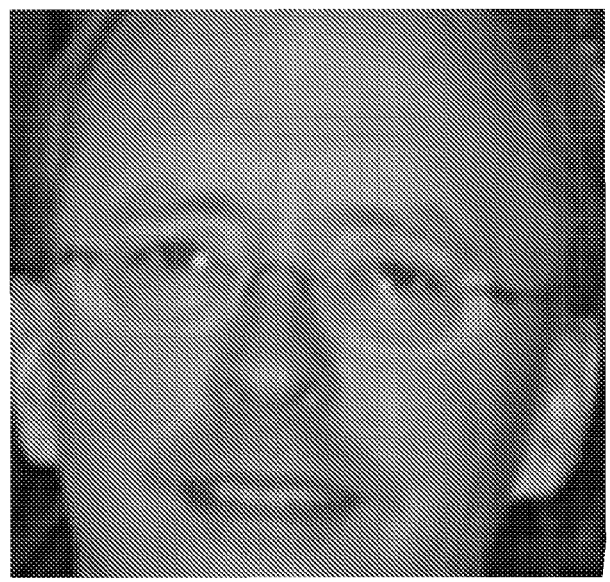
FIG. 15A depicts in image 1500 of a portion of a human face.
Figure 15B:
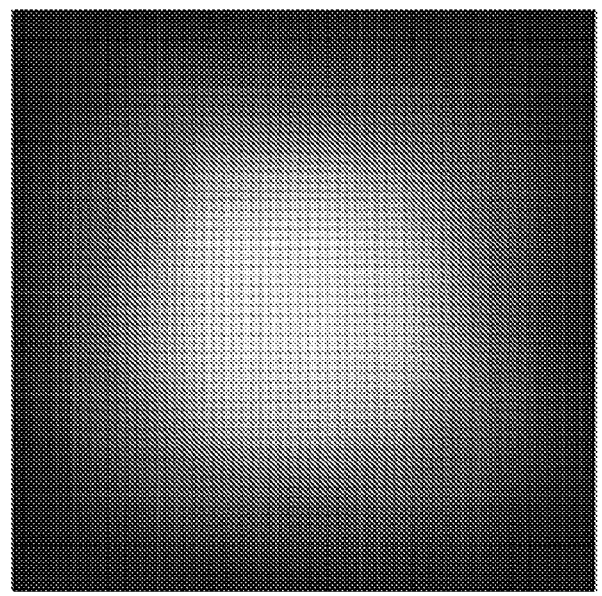
FIG. 15B depicts the sensor output 1505 for image 1500 viewed using a lensless image sensor of the type described above.

FIG. 15A depicts in image 1500 of a portion of a human face. FIG. 15B depicts the sensor output 1505 for image 1500 viewed using a lensless image sensor of the type described above. Galleries of images of this type, stored in a database and related to the names of the corresponding people, would be compared with similar probe images. Basing the comparisons on raw sensor data (e.g. image 1505) rather than an image (e.g., 1500) advantageously avoids the computationally complex process of constructing images from sensor data. Moreover, the fact that all of the gallery and probe images are unintelligible to a human observer can afford users a degree of security. In effect, the image transform imposed by the image sensor is a form of encryption.

Comparing a sample against a gallery of references to assign a label to the sample is sometimes referred to as "classification." For face recognition, each "class" represents a person's face, and can include any number of exemplars representative of that face, or a "training vector" computed from one or more exemplars. Sample image data is then compared with the classes to find the class that most closely matches. Many methods of classification are known to those of skill in the art of pattern recognition generally, and in face recognition in particular.

The inventors demonstrated the efficacy of lensless sensors to facial recognition and detection using a k-nearest-neighbor classifier in which each scene—faces in this example—is represented by a vector of sensor values, x. The category label (name) is that of the person whose training vector x in the reference gallery most closely matches the probe image, or "query vector." A face is deemed "present" if the distance from the query vector to each stored face or the training vector is not larger than some criterion A. This criterion depends upon the training dataset, the number of features used, and the application-specific confidence. The features can be, for instance, based on pixel values or collections of pixel values from the raw images where the largest disparities are observed over the training set. If typical non-face query images are similar to those in the database, or if the application demands a penalty for erroneously deciding that a face is present (when none is), then Δ is set small.

While the subject matter has been described in connection with specific embodiments, other embodiments are also envisioned. For example; while each grating detailed previously may be used in connection with photoreceptors to collect incident light, gratings in accordance with these and other embodiments can be used more generally in imaging devices that project images using photoelements that admit light; cameras described as using lenses could also employ other types of optical elements (e.g., mirrors); the wavelength band of interest can be broader or narrower than the visible spectrum, may be wholly or partially outside the visible spectrum, and may be discontinuous; and cameras and gratings detailed herein can be adapted for use in multi-aperture or programmable-aperture applications. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. An optical method of measuring motion, the method comprising:
   receiving light in a wavelength band of interest from a scene at a phase grating that defines a transverse plane, the phase grating producing a diffraction pattern;
   capturing a first image of the diffraction pattern and a second image of the diffraction pattern;
   comparing the first image of the diffraction pattern with the second image of the diffraction pattern to produce an image comparison; and
   calculating apparent motion from the image comparison;
   wherein comparing the first image with the second image comprises performing a mathematical transformation of at least one of the first image and the second image.

2. The method of claim 1, wherein the mathematical transformation comprises a Fourier transform.

3. The method of claim 1, wherein the transformation is a 2-D transformation.

4. The method of claim 1, wherein comparing the first image with the second image comprises performing a mathematical transformation on the first image and the second image to obtain a first frame and a second frame, respectively, and wherein comparing the first image with the second image comprises cross-correlating the first frame and the second frame.

5. The method of claim 1, wherein comparing the first image with the second image comprises, for each image, combining two-dimensional information from that image into a one-dimensional vector, and then comparing the one-dimensional vectors.

6. The method of claim 5, wherein each of the first and second images is arranged in rows and columns of pixels, and wherein combining two-dimensional information into a one-dimensional vector comprises forming vector elements that are each a sum of pixels in a respective row or a sum of pixels in a respective column.

7. The method of claim 6, comprising forming two one-dimensional vectors, a first vector with vector elements that are each a sum of pixels in a respective row and a second vector with vector elements that are each a sum of pixels in a respective column, and using the first vector to calculate apparent motion top to bottom, and using the second vector to calculate apparent motion left to right.

8. The method of claim 1, wherein comparing the first image of the diffraction pattern with the second image of the diffraction pattern comprises selecting at least first and second corresponding subregions in each of the first and second images, and separately comparing the first subregions in the first and second images, and the second subregions in the first and second images.

9. The method of claim 8, wherein the capturing is performed by an image sensor, the method further comprising using differences in the apparent motion between the first and second subregions to estimate apparent motion in a direction normal to a plane of the sensor.

10. The method of claim 1, wherein the diffraction pattern comprises normally arranged curtains of minimum intensity for light incident the phase grating and normal to the transverse plane of the phase grating.

11. A method of measuring a characteristic of a scene using a diffraction pattern from a phrase grating, the method comprising:
    receiving light in a wavelength band of interest from a scene at a phase grating that defines a transverse plane, the phase grating inducing near-field spatial modulations producing a diffraction pattern;
    capturing images of the diffraction pattern on an image sensor; and
    determining apparent motion of the scene from the images of the diffraction pattern captured on the image sensor, the determination made at least in part based on the near-field spatial modulations.

12. The method of claim 11, wherein for light incident the phase grating and normal to the transverse plane of the phase grating, the diffraction pattern comprises normally arranged curtains of minimum intensity.

13. The method of claim 11, wherein the phase grating is spaced from the image sensor by at least twenty times a wavelength of light incident the phase grating.

* * * * *